(12) United States Patent
Sa et al.

(10) Patent No.: US 11,584,416 B2
(45) Date of Patent: *Feb. 21, 2023

(54) HANDLE ASSEMBLY HAVING POWER ASSIST FUNCTION FOR CARTS AND CART COMPRISING THE SAME

(71) Applicant: LG ELECTRONICS INC., Seoul (KR)

(72) Inventors: Jaecheon Sa, Seoul (KR); Sunryang Kim, Seoul (KR); Keunsik No, Seoul (KR)

(73) Assignee: LG ELECTRONICS INC., Seoul (KR)

(*) Notice: Subject to any disclaimer, the term of this patent is extended or adjusted under 35 U.S.C. 154(b) by 312 days.

This patent is subject to a terminal disclaimer.

(21) Appl. No.: 16/757,854

(22) PCT Filed: Mar. 22, 2019

(86) PCT No.: PCT/KR2019/003401
§ 371 (c)(1),
(2) Date: Apr. 21, 2020

(87) PCT Pub. No.: WO2020/196936
PCT Pub. Date: Oct. 1, 2020

(65) Prior Publication Data
US 2021/0213994 A1    Jul. 15, 2021

(51) Int. Cl.
*B62B 5/00* (2006.01)
*B62B 3/14* (2006.01)
*B62B 5/06* (2006.01)

(52) U.S. Cl.
CPC .............. *B62B 5/0073* (2013.01); *B62B 3/14* (2013.01); *B62B 5/062* (2013.01)

(58) Field of Classification Search
CPC ......... B62B 5/0073; B62B 3/14; B62B 5/062; B62B 3/001; E05B 65/1046; E05B 65/1053; E05B 65/108
See application file for complete search history.

(56) References Cited

U.S. PATENT DOCUMENTS

| | | | | |
|---|---|---|---|---|
| 5,746,282 A | * | 5/1998 | Fujiwara ............. | B60L 15/2009 180/6.5 |
| 6,457,545 B1 | * | 10/2002 | Michaud ............... | B60N 2/002 200/85 A |
| 7,469,942 B2 | * | 12/2008 | Whitaker ............. | E05B 65/108 70/92 |
| 2010/0045053 A1 | * | 2/2010 | Dye .................... | E05B 65/1053 292/201 |

(Continued)

FOREIGN PATENT DOCUMENTS

| | | |
|---|---|---|
| JP | 5-286453 A | 11/1993 |
| JP | 7-33026 A | 2/1995 |

(Continued)

*Primary Examiner* — James A Shriver, II
*Assistant Examiner* — Michael T. Walsh
(74) *Attorney, Agent, or Firm* — Birch, Stewart, Kolasch & Birch, LLP

(57) ABSTRACT

A handle assembly for a cart with a power assist function can sense the direction that a user's force is applied, and provide assist power in the corresponding direction, such that the user can easily move the cart. A cart including the handle assembly allows the user to conveniently move the cart.

20 Claims, 8 Drawing Sheets

(56) References Cited

U.S. PATENT DOCUMENTS

| | | | |
|---|---|---|---|
| 2014/0109479 A1* | 4/2014 | Morstatt | E05B 65/1093 |
| | | | 292/144 |
| 2015/0129333 A1* | 5/2015 | Morris | A61G 1/0212 |
| | | | 180/65.8 |
| 2018/0118245 A1* | 5/2018 | Chung | B62B 5/0043 |
| 2018/0170417 A1* | 6/2018 | Casey | B62B 1/008 |

FOREIGN PATENT DOCUMENTS

| | | |
|---|---|---|
| JP | 8-58598 A | 3/1996 |
| KR | 96-37464 A | 11/1996 |

\* cited by examiner

[FIG. 1]

[FIG. 3]
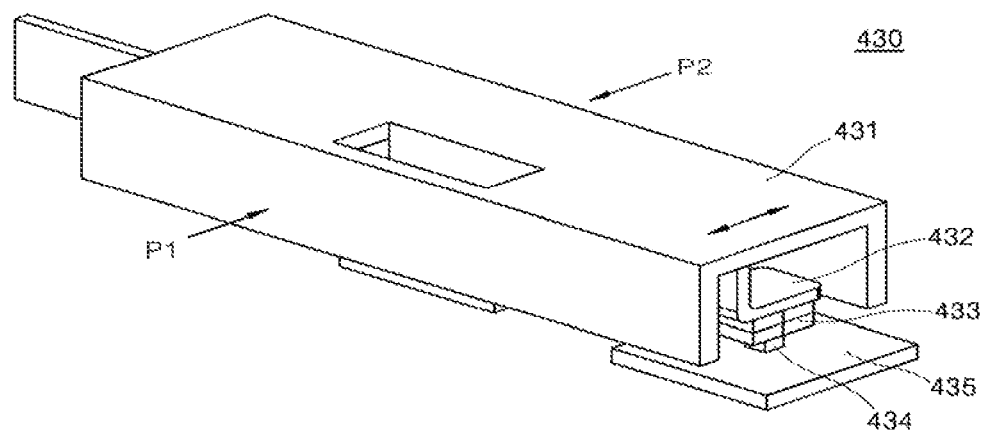

[FIG. 4]
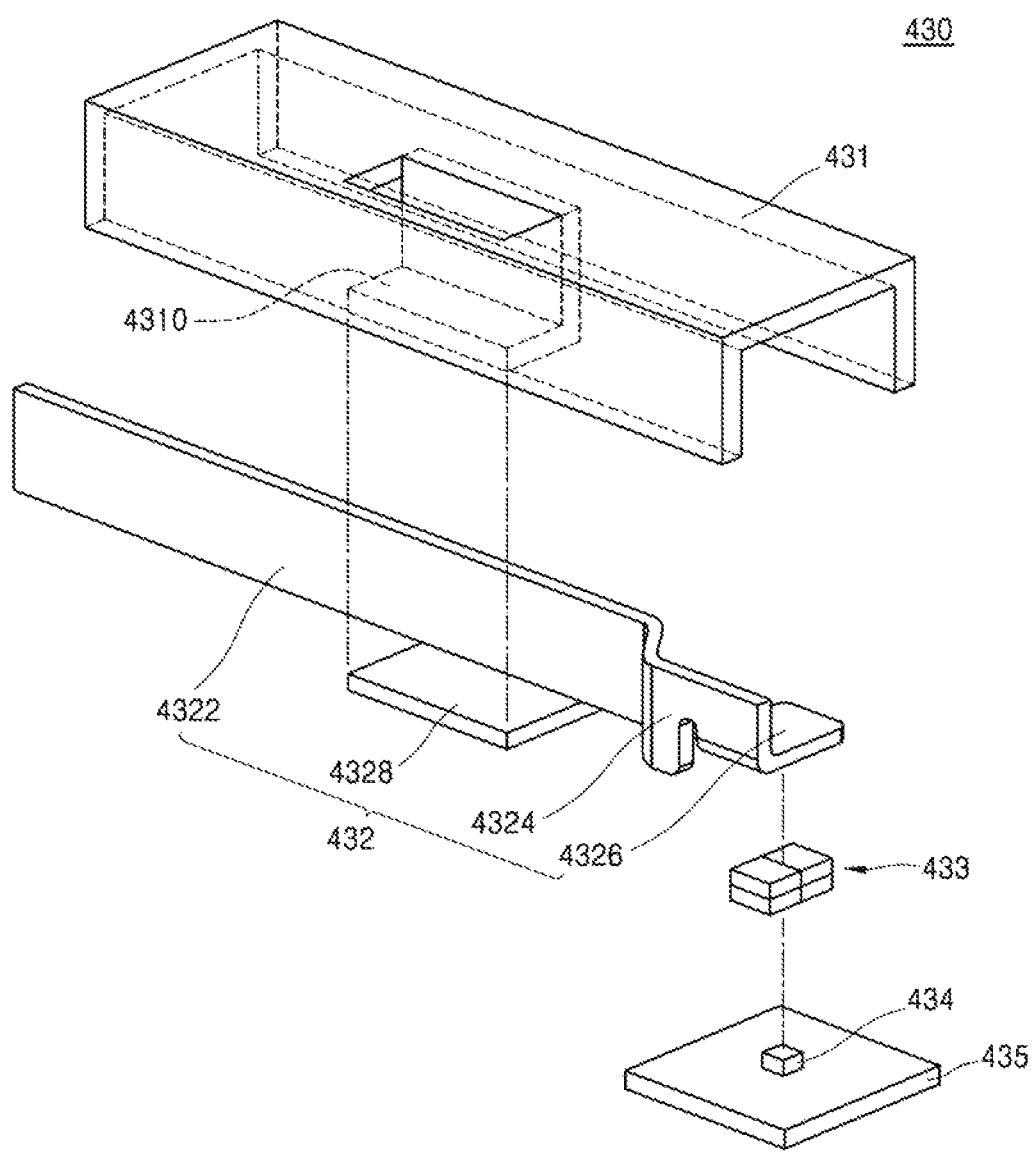

[FIG. 5]
430
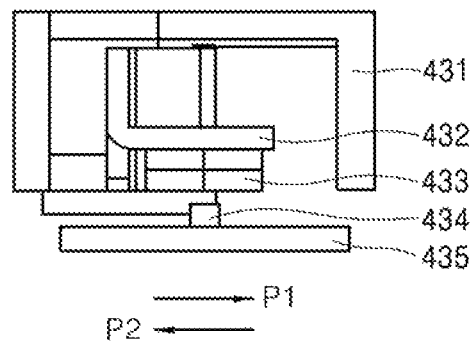
[FIG. 6]
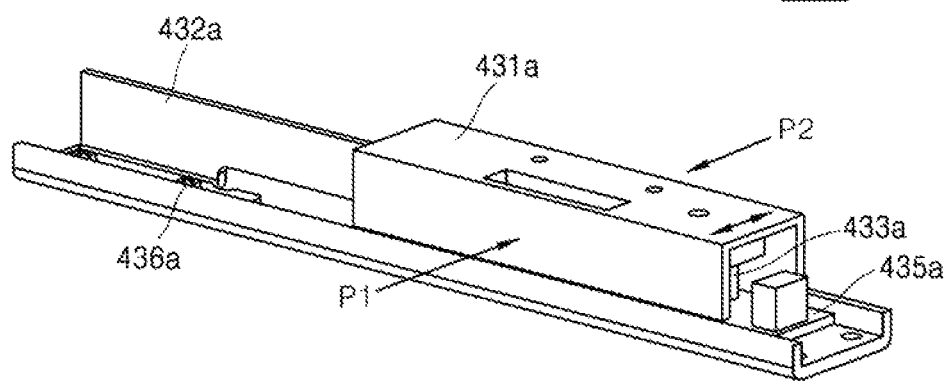

[FIG. 8]
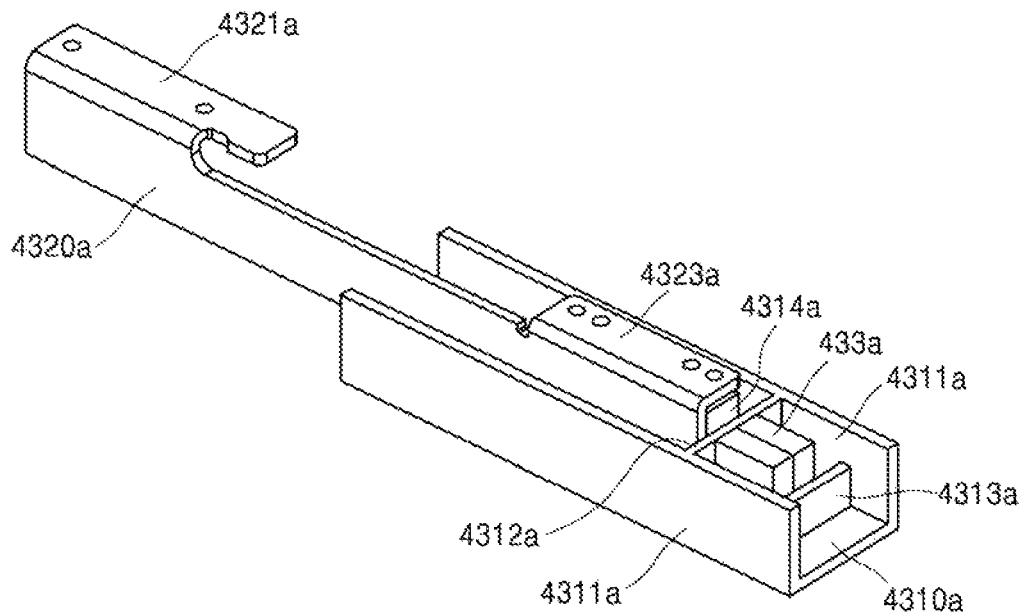
[FIG. 9]
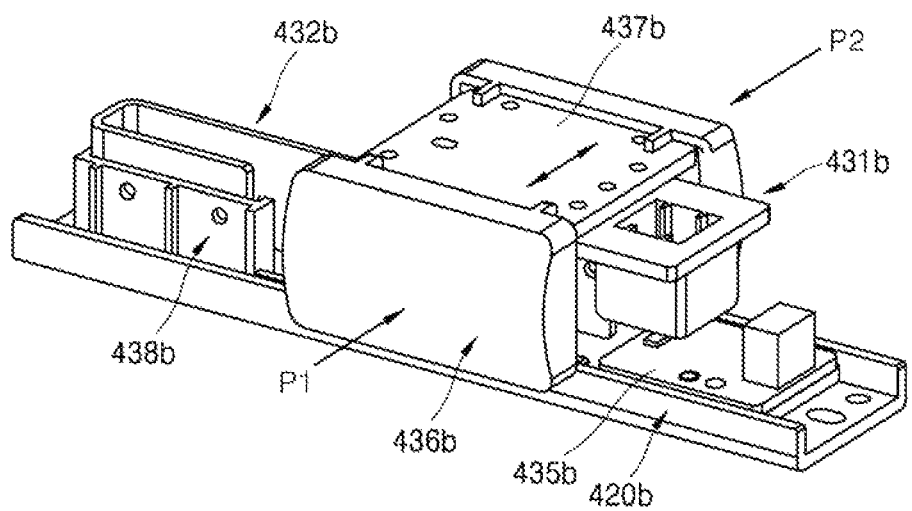

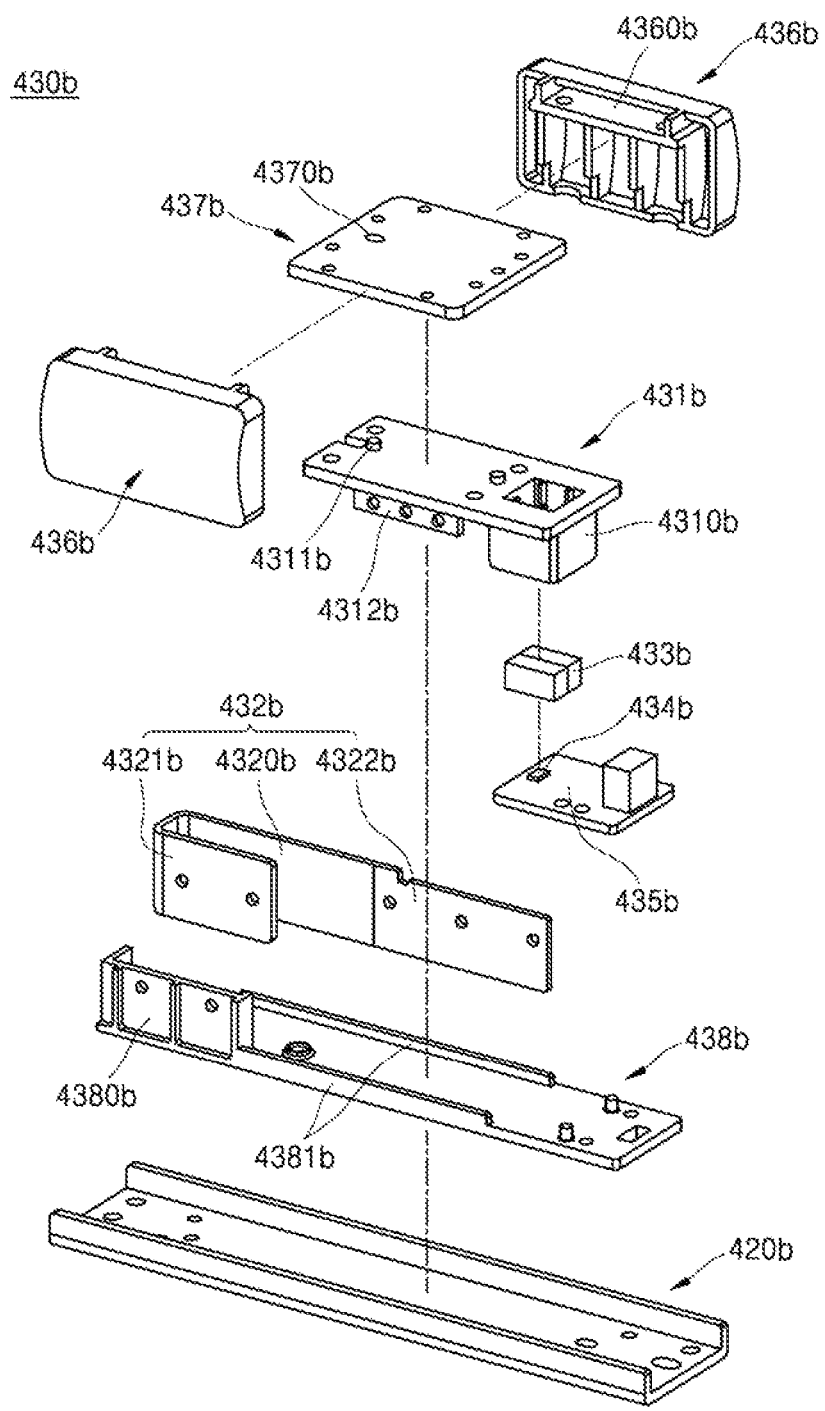
[FIG. 10]

HANDLE ASSEMBLY HAVING POWER ASSIST FUNCTION FOR CARTS AND CART COMPRISING THE SAME

CROSS-REFERENCE TO RELATED APPLICATIONS

This application is the National Phase of PCT International Application No. PCT/KR2019/003401 filed on Mar. 22, 2019, all which are hereby expressly incorporated by reference into the present application.

TECHNICAL FIELD

The present disclosure relates to a handle assembly having a power assist function for carts and a cart comprising the same.

BACKGROUND ART

Various types of carts are used to carry heavy articles or luggage in supermarkets, department stores, airports, and the like.

A cart used in a space for shopping, such as a supermarket or a department store, is provided with a plurality of wheels at a lower portion of a basket for receiving an object such that a user can move the cart by pushing or pulling a handle. Carts used in airports and the like may be similar to such a cart and may further have a brake function.

The cart is a necessary product for user convenience, since the cart allows a user to move without directly carrying a large number of heavy objects. However, if the cart is loaded with an increased number of objects or a heavy object, a user is required to apply large force to the cart in order to move the cart, thereby causing user inconvenience.

Moreover, when the cart is provided with a sensor to sense the direction of force applied for movement of the cart, vibration occurs not only in the horizontal direction but also in the vertical direction due to movement of the cart on the ground, thereby complicating control for accurate sensing. Therefore, there is a need for development of a cart that accurately senses force applied to the cart while avoiding complicated control.

DISCLOSURE

Technical Problem

Embodiments of the present disclosure provide a handle assembly having a power assist function for carts, which can assist in power in a direction of force applied to the cart by a user by sensing the direction of force to allow the user to conveniently move the cart, and a cart comprising the same.

Embodiments of the present disclosure provide a handle assembly having a power assist function for carts, which can assist in power in a direction of force applied to a cart by a user by accurately sensing the direction of force through a simple structure, and a cart comprising the same.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

Technical Solution

In accordance with one embodiment of the present disclosure, a handle assembly of a cart includes: a handle bar provided to one side of the cart and receiving external force applied to the cart in a movement direction of the cart; and a force sensing assembly (module) including a moving frame disposed inside the handle bar in a longitudinal direction of the handle bar, the moving frame having two surfaces facing each other and partially exposed outside the handle bar, a spring coupled at one end thereof to an interior of the handle bar and having the other end extending to be adjacent to the moving frame, the spring being pressed and deformed by the moving frame in a direction of the external force applied to the cart, a magnet coupled to the other end of the spring or a lower side of the moving frame, the magnet being a permanent magnet, a Hall sensor disposed adjacent to the magnet and sensing a location of the magnet, and a sensor printed circuit board (PCB) on which the Hall sensor is mounted, the sensor PCB determining the direction of the external force based on a detection result of the Hall sensor.

The handle assembly may further include a base frame disposed in the longitudinal direction of the handle bar and coupled to the interior of the handle bar, wherein the spring is coupled at one end thereof to one side of an upper surface of the base frame and the sensor PCB is coupled to the other side of the upper surface of the base frame.

The moving frame may include an upper surface disposed in the longitudinal direction of the handle bar, side surfaces respectively connected to opposite sides of the upper surface and facing each other, and a plurality of partitions disposed between the upper surface and the side surfaces, and the magnet may be inserted into a space between the partitions.

The spring may include a spring body disposed parallel to the side surfaces, a first connection plane vertically extending from one end of the spring body and coupled to the upper surface of the base frame, and at least one connection plane vertically extending from the other end of the spring body and coupled to the moving frame.

In accordance with another embodiment of the present disclosure, a handle assembly of a cart includes: a handle bar provided to one side of the cart and receiving external force applied to the cart in a movement direction of the cart; and a force sensing module including a frame supporter disposed on the handle bar and moving in a direction of the external force input to the handle bar and a force sensor unit disposed adjacent to the frame supporter and sensing a movement direction of the frame supporter.

The force sensor unit may include: a magnet coupled to one side of the frame supporter and moved in a direction corresponding to the direction of the external force by the frame supporter, the magnet being a permanent magnet; a Hall sensor disposed adjacent to the magnet and sensing a location of the magnet; and a sensor PCB on which the Hall sensor is mounted, the sensor PCB determining the direction of the external force based on a sensing result of the Hall sensor.

The frame supporter may include: a pair of cover pads disposed on the handle bar and at least partially exposed in front and rear directions of the handle bar, respectively; a connecting plate disposed between the cover pads to connect the cover pads to each other; a moving bracket coupled to a lower portion of the connecting plate and receiving the magnet; and a spring coupled at one end thereof to a lower portion of the moving bracket and at the other end thereof to an interior of the handle bar, the spring being disposed parallel to plate surfaces of the cover pads.

The handle assembly may further include a sensor holder bracket disposed on the handle bar and provided at one side thereof with a spring coupling portion parallel to one end of the spring such that the one end of the spring is coupled to the spring coupling portion, the sensor PCB being coupled to the other side of the sensor holder bracket.

The handle assembly may further include a base frame disposed on the handle bar to be placed under the sensor holder bracket and coupled to the sensor holder bracket.

In accordance with a further embodiment of the present disclosure, a cart includes: a main body provided with a drive unit generating electric power and a controller controlling the drive unit; a plurality of wheels coupled to a lower portion of the main body and moving the main body; a handle bar provided to one side of the main body and receiving external force applied in a movement direction of the main body; and a force sensing module including a frame supporter disposed on the handle bar and moving in a direction of the external force input to the handle bar and a force sensor unit disposed adjacent to the frame supporter and sensing a movement direction of the frame supporter, wherein the controller transmits the power generated from the drive unit to the wheels in the movement direction of the frame supporter sensed by the force sensor unit.

The cart may further include a base frame disposed in the longitudinal direction of the handle bar and coupled to an interior of the handle bar, wherein a spring is coupled at one end thereof to one side of an upper surface of the base frame and the sensor PCB is coupled to the other side of the upper surface of the base frame.

The force sensing module may further include the spring coupled at one end thereof to the interior of the handle bar and extending to be adjacent to the moving frame, the spring being pressed and deformed by the moving frame in a direction of the external force applied to the cart; and the force sensor unit may include a magnet coupled to the other end of the spring or a lower side of the moving frame, the magnet being a permanent magnet, a Hall sensor disposed adjacent to the magnet and sensing a location of the magnet, and a sensor PCB on which the Hall sensor is mounted, the sensor PCB determining the direction of the external force based on a detection result of the Hall sensor.

The moving frame may include an upper surface disposed in the longitudinal direction of the handle bar, side surfaces respectively connected to opposite sides of the upper surface and facing each other, and a plurality of partitions disposed between the upper surface and the side surfaces, and the magnet may be inserted into a space between the partitions.

The spring may include a spring body disposed parallel to the side surfaces, a first connection plane vertically extending from one end of the spring body and coupled to the upper surface of the base frame, and at least one connection plane vertically extending from the other end of the spring body and coupled to the moving frame.

Advantageous Effects

According to embodiments of the present disclosure, the handle assembly allows a user to conveniently move a cart by sensing a direction of force applied to the cart by the user and providing assistant force (power assist function) in the corresponding direction, thereby improving user convenience.

In addition, according to the embodiments of the present disclosure, the handle assembly includes a force sensing module configured to allow the cart to have the degree of moving freedom only in the direction of force applied by a user and thus can be controlled without consideration of noise in the vertical direction. Accordingly, the handle assembly can perform constant and accurate sensing and does not require a complicated control algorithm, thereby providing effects of improving control efficiency while reducing manufacturing costs.

Effects of the present disclosure are not limited to the above-described ones, and one having ordinary skill in the art to which the disclosure pertains may easily draw various effects from the configuration of the disclosure.

DESCRIPTION OF DRAWINGS

FIG. 3 is a perspective view of a force sensing module according to a first embodiment of the present disclosure.

FIG. 4 is an exploded perspective view of the force sensing module shown in FIG. 3.

FIG. 5 is a side view of the force sensing module shown in FIG. 3.

FIG. 6 is a perspective view of a force sensing module according to a second embodiment of the present disclosure.

FIG. 8 is a bottom perspective view of the force sensing module shown in FIG. 6.

FIG. 9 is a perspective view of a force sensing module according to a third embodiment of the present disclosure.

FIG. 10 is an exploded perspective view of the force sensing module shown in FIG. 9.

BEST MODE

Figure 1:
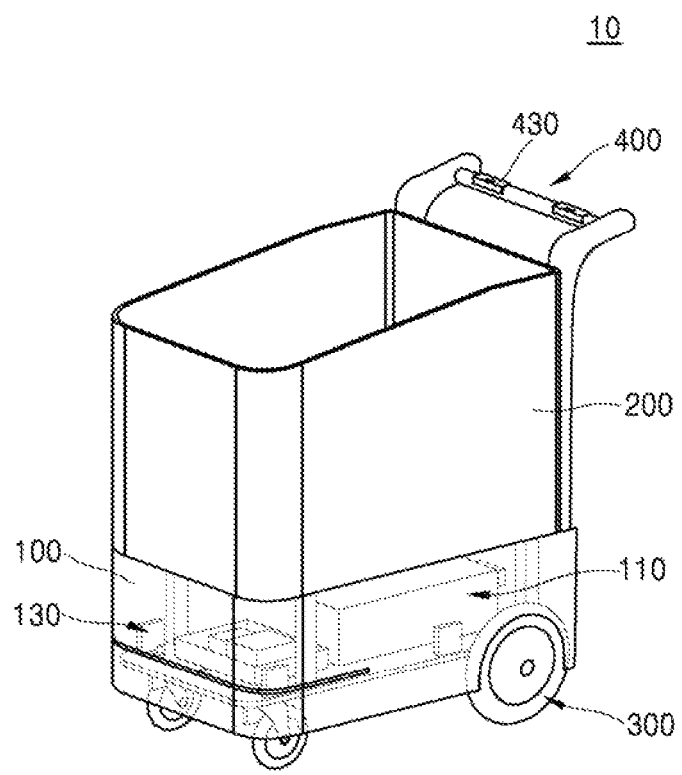
FIG. 1 is a perspective view of a cart according to the present disclosure.

The above and other aspects, features, and advantages of the present disclosure will be described in more detail in conjunction with the accompanying drawings so as to fully convey the spirit of the present disclosure to those skilled in the art. Descriptions of known functions and constructions which can unnecessarily obscure the subject matter of the present disclosure will be omitted. Hereinafter, embodiments of the present disclosure will be described in detail with reference to the accompanying drawings. Like components will be denoted by like reference numerals throughout the accompanying drawings.

Herein, when a certain element or component is referred to as being "disposed at an upper portion (lower portion)" or "disposed on (under)" another element or layer, this means that the certain element or component can adjoin an upper (lower) surface of the other element or component or intervening elements or components can be present therebetween.

In addition, when a certain element or component is referred to as being "connected to", "coupled to" or "joined to" another element or component, it means that these elements or components may be directly connected to, coupled to or joined to each other or through another element or component, or another element or component may be "interposed" therebetween.

Hereinafter, the term "cart" means a device that is manually moved under user control or moved by electric power. The cart may have or may not have a function of receiving an object. The cart may be used in shopping spaces, such as supermarkets, department stores, and small and mediumsized stores, leisure spaces, such as golf courses, and traveling spaces, such as airports and ports.

Figure 2:
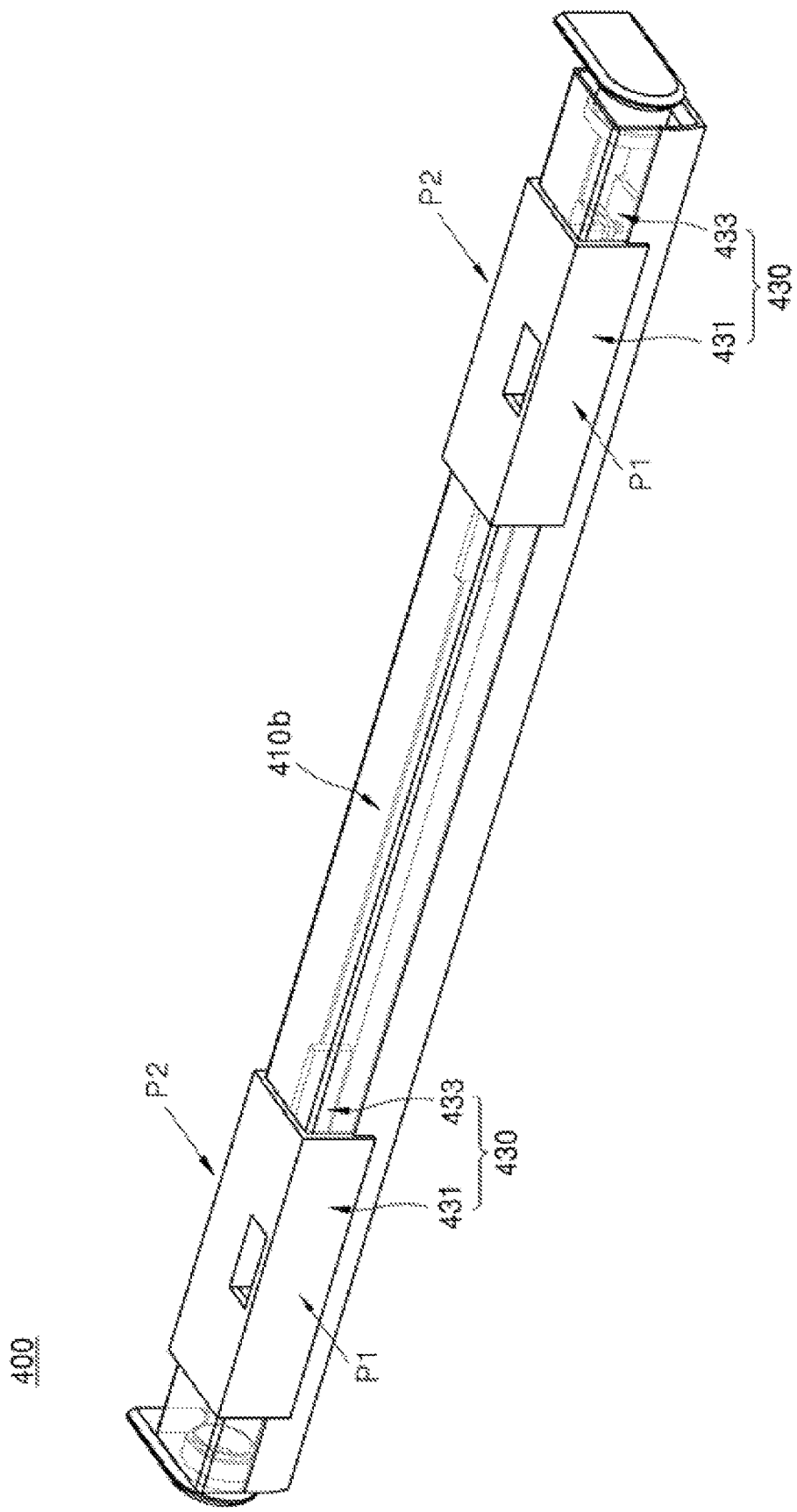
FIG. 2 is a perspective view of a handle assembly according to the present disclosure.

FIG. 1 is a perspective view of a cart according to the present disclosure. FIG. 2 is a perspective view of a handle assembly according to the present disclosure. FIG. 3 is a perspective view of a force sensing module according to a first embodiment of the present disclosure. FIG. 4 is an exploded perspective view of the force sensing module shown in FIG. 3. FIG. 5 is a side view of the force sensing module shown in FIG. 3.

Referring to FIG. 1, a cart 10 according to one embodiment of the present disclosure includes a main body 100 provided with a drive unit 110 and a controller 130; a receiving portion 200 disposed at one side of the main body 100; a plurality of wheels 300 coupled to a lower portion of the main body 100; and a handle assembly 400 coupled to one side of the main body 100 or the receiving portion 200. The handle assembly 400 includes a handle bar 410b gripped by a user and a force sensing module 430 adapted to sense an intended direction of force applied by the user.

The main body 100 may have a substantially hexahedral shape and is provided with various components. The main body 100 may be provided therein with the drive unit 110 that supplies electric power to the wheels 300 and the controller 130 that performs overall control of the cart 10. Although not shown in the drawings, the main body 100 may be provided with various sensors or control devices for driving the cart 10.

The drive unit 110 may include a battery and a motor. The drive unit 110 may supply assistant force to some of the plural wheels 300 under control of the controller 130. When the assistant force is supplied to the wheels 300, the assistant force is additionally applied in a direction of force applied by a user, whereby the user can easily move the cart 10. Herein, the function of supplying assistant force for movement of the cart is defined as a "power assist" function.

The controller 130 may determine the direction of force applied by a user through the force sensing module 430 disposed on the handle assembly 400 and may control the cart 10 to move in the corresponding direction. Control of the controller 130 may include operation of the drive unit 110, a transmission direction of assistant force generated by the drive unit 110, and a rotational direction of the wheels 300 to which the assistant force is transmitted.

For example, upon sensing that a user intends to move in a front direction, the controller 130 may operate the drive unit 110 to generate drive force and control the transmission direction of the drive force to the wheels 300 such that the wheels 300 rotate in the front direction. Conversely, upon sensing that the user intends to move in a rear direction, the controller 130 may operate the drive unit 110 to generate drive force and control the transmission direction of the drive force to the wheels 300 such that the wheels 300 rotate in the rear direction.

To this end, the controller 130 controls the force sensing module 430 and the drive unit 110 while communicating therewith. In addition, the controller may directly control the rotational direction of the wheels 300 or may control a power transmission direction of the drive unit 110 connected to the wheels 300 to control the rotational direction of the wheels 300.

The receiving portion 200 may be disposed at an upper side of the main body 100. Alternatively, the receiving portion 200 may be disposed on a side surface, a front surface or a rear surface of the main body 100 according to use place or use purpose of the cart.

The wheel 300 is provided in plural and is rotatably connected to the lower portion of the main body 100. In this embodiment, two wheels 300 are provided to a front side of the main body and two wheels 300 are provided to a rear side thereof. The wheels 300 disposed at the rear side of the main body may be manually rotated when a user pushes the cart 10, or may be semi-automatically or automatically rotated by electric power supplied from the drive unit 110. The wheels 300 at the rear side of the main body may have a larger size than the wheels 300 at the front side thereof.

The handle assembly 400 according to the first embodiment is disposed at the rear side of the main body 100 and the receiving portion 200. The handle assembly 400 may be coupled to the receiving portion 200 or the main body 100. The handle assembly 400 may include the handle bar 410b gripped by a user and the force sensing module 430 disposed on the handle bar 410b. The handle bar 410b is coupled to the receiving portion 200 or the main body 100 through a separate frame structure.

As shown in FIG. 2, the handle bar 410b is a straight bar and is composed of a plurality of frames constituting an external appearance thereof. The handle bar 410b may have an accommodation space defined by the frames. The accommodation space receives the force sensing module 430 such that some components of the force sensing module 430 are partially exposed outside the handle bar 410b.

Referring to FIG. 2, P1 indicates a direction of force applied to the cart 10 by a user attempting to move in a front direction. P2 indicates a direction of force applied to the cart 10 by the user attempting to move in a rear direction. When the user moves in the front direction, the user pushes the cart 10 in the direction P1, and when the user moves in the rear direction, the user pulls the cart 10 in the direction P2. Such a direction of force is sensed through the force sensing module 430, which in turn sends the sensed result to the controller 130 so as to be used in the provision of the power assist function.

As shown in FIG. 2 to FIG. 5, the force sensing module 430 includes a moving frame 431, a spring 432, a magnet 433, a Hall sensor 434, and a sensor PCB.

The moving frame 431 is formed by bending a plate having a predetermined size in a one-side open rectangular shape and is disposed such that the open side of the plate faces downwards. The moving frame 431 is disposed in a longitudinal direction of the handle bar 410b. Two surfaces of the moving frame 431 facing each other are disposed in the longitudinal direction of the handle bar 410b to be partially exposed in the front and rear directions of the handle bar 410b. A user can approach an exposed portion of the moving frame 431 through the handle bar 410b. Accordingly, the moving frame 431 may be pressed and pushed into the handle bar 410b by a user. In addition, since the two surfaces of the moving frame 431 facing each other can be pressed by a user, the moving frame 431 may be used to sense force in two directions P1 and P2 (this will be described below). An inner surface of the moving frame 431 is formed with a pressing portion 4310 to press the spring 432.

The pressing portion 4310 protrudes from the inner surface of the moving frame 431 in the longitudinal direction thereof. The pressing portion 4310 is formed on one of the two surfaces of the moving frame 431 facing each other. The pressing portion 4310 may protrude in a reversed one-side open rectangular shape or in a rectangular shape. The pressing portion 4310 is partially brought into contact with an abutment plane 4328 of the spring 432 to press the spring 432 described below. The shape of the pressing portion 4310 may vary depending upon the shape of the spring 432.

The spring 432 may be implemented by a leaf spring, which is a kind of plate-shaped spring. The spring 432 includes a spring body 4322 disposed inside the moving frame 431 in the longitudinal direction thereof, a magnet mount plane 4326 formed at one end of the spring body 4322 and having the magnet 433 mounted thereon, a connection plane 4324 connecting the spring body 4322 to the magnet mount plane 4326, and the abutment plane 4328 contacting the pressing portion 4310.

The spring body 4322 is a plate-shaped spring having a predetermined length and width. The spring body 4322 is disposed such that a plate surface of the spring body 4322 is parallel to the two surfaces of the moving frame 431 facing each other. Although not shown in the drawings, the spring body 4322 is secured at one end thereof to one side of the interior of the handle bar 410b and extends in the longitudinal direction of the moving frame 431. The other end of the spring body 4322 is partially bent to form a curved surface. The curved surface of the spring body is defined as a connection plane 4324. The connection plane 4324 is bent at one end thereof and extends in a direction perpendicular to the plate surface of the spring body 4322. The extended plane of the connection plane is defined as the magnet mount plane 4326.

The connection plane 4324 is bent to protrude towards a front surface of the handle bar 410b corresponding to the direction P1 of FIG. 3. When the moving frame 431 is moved in the direction P1, the spring body 4322 is pushed in the direction P1 by the pressing portion 4310. When the moving frame 431 is moved in the direction P2, the spring body 4322 is pushed in the direction P2 by one surface of the moving frame 431 disposed in the direction P2.

Although the connection plane 4324 is illustrated as a curved plane in FIG. 4, the connection plane 4324 may be omitted depending upon installation conditions, the shape of the handle bar 410b, the location of the Hall sensor 434, and the like. In the structure wherein the connection plane 4324 is omitted, one end of the spring body 4322 may be partially cut to form the magnet mount plane 4326.

The magnet mount plane 4326 may vertically extend from one end of the connection plane 4324 to be parallel to the Hall sensor 434. The magnet 433 is coupled to the magnet mount plane 4326. The magnet mount plane 4326 is formed at a location where the magnet 433 is separated a predetermined distance from the Hall sensor 434. The magnet mount plane 4326 may have a size corresponding to the magnet 433 or a larger size than the magnet 433.

The abutment plane 4328 may vertically extend from one end of the spring body 4322 in the longitudinal direction thereof. In the present disclosure, the abutment plane 4328 is formed at one side of a lower end of the spring body 4322 in the longitudinal direction thereof. The abutment plane 4328 adjoins a lower surface of the pressing portion 4310 of the moving frame 431 to support the moving frame 431 at a lower side of the spring body 4322.

As described above, the magnet 433 is coupled to a lower surface of the magnet mount plane 4326. The magnet 433 may be secured to the magnet mount plane 4326 by a bonding agent and the like. Alternatively, the magnet mount plane 4326 may be provided with a box-shaped holder into which the magnet 433 may be inserted.

In the state of being coupled to the magnet mount plane 4326, the magnet 433b is separated a predetermined distance from the Hall sensor 4332. The magnet 433b is a permanent magnet and has an N pole and an S pole. Even when the magnet 433b is moved by the moving frame 431, the magnet 433b is prevented from deviating from a sensing region of the Hall sensor 4332. Thus, the size and location of the magnet 433b are designed corresponding to the sensing region of the Hall sensor 4332.

As shown in FIG. 4 and FIG. 5, the Hall sensor 434 is coupled to the sensor PCB 435 to be disposed under the magnet 433. The sensor PCB 435 may be coupled to an inner lower side of the handle bar 410b.

The Hall sensor 4332 is mounted on the sensor PCB 4331 at a location corresponding to the location of the magnet 4333. Since the magnet 433b is moved in the front and rear directions of the cart 10 in a state of being coupled to the moving frame 431, the Hall sensor 4332 may be disposed corresponding to the center of the magnet 433b before movement of the magnet 4333.

The Hall sensor 4332 serves to detect variation in a magnetic field resulting from movement of the magnet 4333. When the magnet 433b moves in the direction P1 or P2, the Hall sensor 4332 senses variation in the magnetic field resulting from movement of the magnet 4333. A sensing result of the Hall sensor 4332 is transmitted to the sensor PCB 4331, which in turn determines the direction of force applied to the cart.

The sensor PCB 4331 supports the Hall sensor 4332 and communicates with the controller 130 to send a sensing result of the Hall sensor 4332 to the controller 130. The sensor PCB 4331 may be provided with various circuits for sensing.

Next, in the cart according to the embodiment of the present disclosure having the aforementioned configuration, force sensing and a power assist process will be described.

As shown in FIG. 4 and FIG. 6, since the moving frame 431 is not moved before movement of the cart 10, the Hall sensor 434 is disposed under the magnet 433b at a location corresponding to the center of the magnet 4333. Here, the spring 432 is not deformed, either.

A user may push the handle bar 410b in order to move the cart 10 in the front direction. Thus, the user presses an outer surface of the moving frame 431 in the direction P1 (for convenience of description, one surface of the moving frame exposed in the front direction of the handle bar is defined as an inner surface of the moving frame and the other surface of the moving frame exposed in the rear direction of the handle bar is defined as the outer surface of the moving frame).

As shown in FIG. 3 and FIG. 5, when force is applied to the outer surface of the moving frame 431 in the direction P1, the pressing portion 4310 presses the spring 432 while moving in the direction P1. Thus, the spring body 4322 of the spring 432 is deformed to allow the magnet mount plane 4326 to move in the direction P1. As a result, the magnet 433b coupled to the magnet mount plane 4326 also moves in the direction P1 and the locations of the Hall sensor 4332 and the pole of the magnet 433b adjacent thereto are changed. As a result, the Hall sensor 4332 senses variation in a magnetic field generated due to movement of the magnet 433 and the sensor PCB 4331 can determine, based on the sensing result, that force is applied in the direction P1. In the present disclosure, a process of sensing the direction of force applied to the cart is defined as "force sensing".

When the sensor PCB 4331 sends the sensing result to the controller 130, the controller 130 may determine that there is a need for the "power assist" process to supply assistant force in the direction P1. The controller 130 may control the drive unit 110 to generate and transmit electric power to the wheels 300. The wheels 300 are driven by the assistant force generated under control of the controller 130.

For example, assuming that a force applied to the cart 10 by a user pushing the cart 10 is 10, a force of 90 may be additionally supplied to push the cart 10 through the power assist function. Thus, although the cart 10 is moved under conditions of the same force and speed as when the cart 10 is moved by a force of 100, an actual force applied to the cart by the user becomes 10. As such, since the user can move the cart 10 with small force, the handle assembly improves user convenience.

Conversely, referring to FIG. 1 to FIG. 3, a user may pull the handle bar 410b in order to move the cart 10 in the rear direction. Here, the user presses the inner surface of the moving frame 431 in the direction P2.

As shown in FIG. 3 and FIG. 5, when force is applied to the moving frame 431 in the direction P2, the inner surface of the moving frame 431 presses the spring body 4322 in the direction P2. Since the magnet mount plane 4326 moves in the direction P2, the magnet 433b also moves in the direction P2 and the distance between the Hall sensor 4332 and the magnet 433b and the pole of the magnet 433b adjacent thereto are changed. As a result, the Hall sensor 4332 senses variation in a magnetic field generated due to movement of the magnet 433 and the sensor PCB 4331 can determine, based on the sensing result, that force is applied in the direction P2.

When the sensor PCB 4331 sends the sensing result to the controller 130, the controller 130 may determine that there is a need for the "power assist" process to supply assistant force in the direction P2. The controller 130 may control the drive unit 110 to generate and transmit electric power to the wheels 300. The wheels 300 are driven by the assistant force generated under control of the controller 130.

In the handle assembly 400 according to the first embodiment described above, although the spring 432 is secured at one end thereof to the interior of the handle bar 410b, the spring is not secured in the vertical direction and thus can be moved in the vertical direction by external force applied in the vertical direction. Accordingly, vibration applied to the cart in the vertical direction during movement of the cart 10 can obstruct accurate sensing of the force sensing module 430.

In order to solve this problem, the handle assembly 400 is provided with a securing structure in the vertical direction in order to prevent vibration in the vertical direction from affecting the force sensing module 430. Hereinafter, handle assemblies according to other embodiments of the present disclosure will be described (detailed descriptions of the same configuration and features as the above embodiment are omitted).

Figure 7:
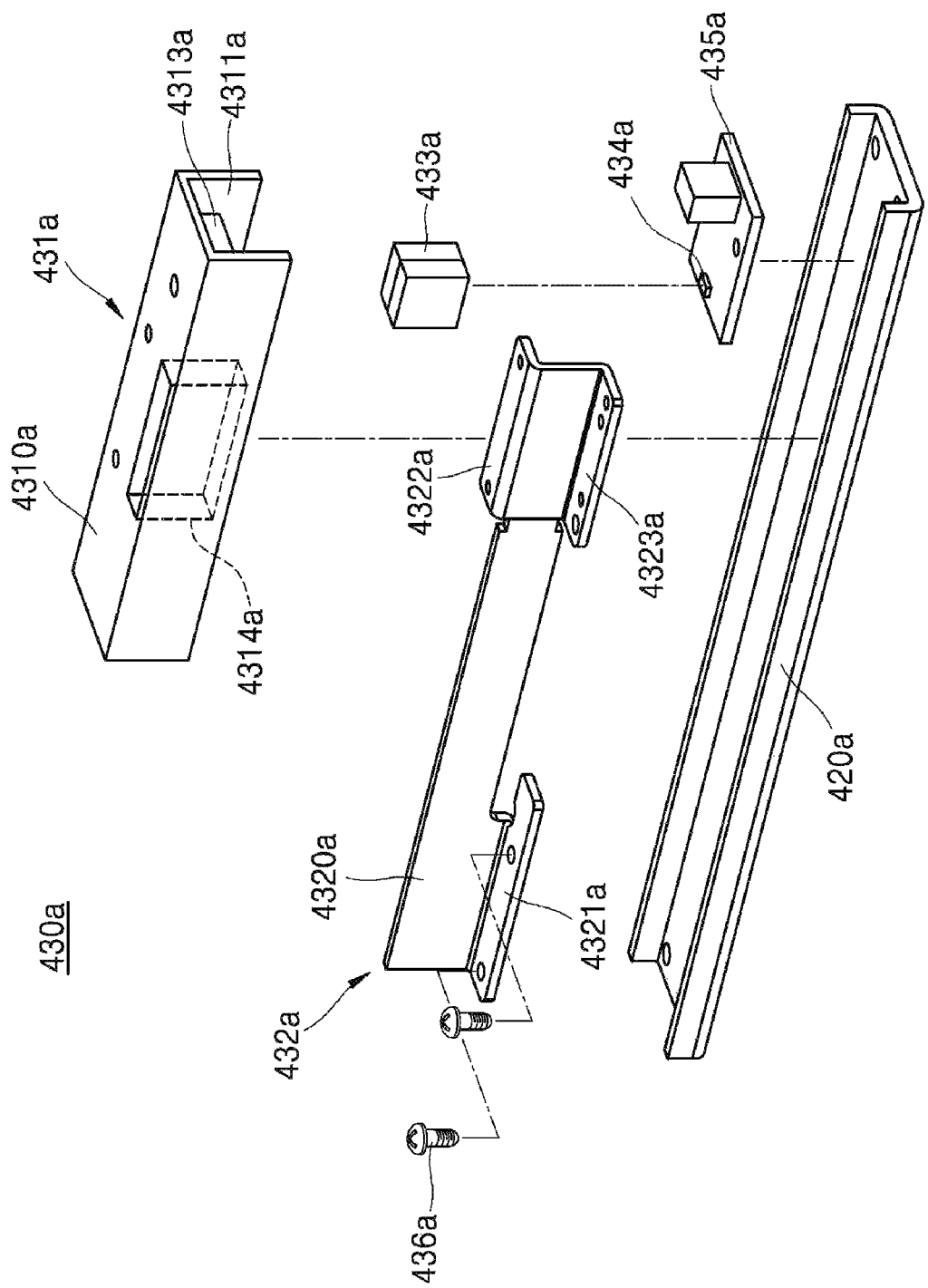
FIG. 7 is an exploded perspective view of the force sensing module shown in FIG. 6.

FIG. 6 is a perspective view of a force sensing module according to a second embodiment of the present disclosure. FIG. 7 is an exploded perspective view of the force sensing module shown in FIG. 6. FIG. 8 is a bottom perspective view of the force sensing module shown in FIG. 6.

The handle assembly 400a according to the second embodiment may include a handle bar 410a, a base frame 420a coupled to the interior of the handle bar 410a, and a force sensing module 430a disposed on the base frame 420a.

Referring to FIG. 6 and FIG. 7, the base frame 420a is disposed in the longitudinal direction of the handle bar 410a and has a rectangular plate shape. The base frame 420a may be bent upwards at opposite edges thereof in the longitudinal direction thereof. Such a shape of the base frame 420a is provided to guide an installation location of the force sensing module 430a. The base frame 420a has a greater length than a spring 432a. The force sensing module 430a is seated on the base frame 420a.

Referring to FIG. 6 to FIG. 8, the force sensing module 430a includes a moving frame 431a, the spring 432a, a magnet 433a, a Hall sensor 434a, and a sensor PCB 435a. The force sensing module 430a may be coupled to the base frame 420a by a fastening member 436a.

As shown in FIG. 7 and FIG. 8, the moving frame 431a is formed by bending a plate having a predetermined size in a one-side open rectangular shape and is disposed such that the open side of the plate faces downwards. Two surfaces of the moving frame 431a facing each other are defined as side surfaces 4311a and a connection plane interposed between the side surfaces 4311a at an upper side of the moving frame 431a is defined as an upper surface 4310a. The moving frame 431a is formed with a first partition 4312a, a second partition 4313a, and a pressing portion 4314a at a lower side of the upper surface 4310a thereof.

The first partition 4312a and the second partition 4313a are disposed to face each other between the two side surfaces 4311a of the moving frame 431a. The magnet 433a is interposed between the first partition 4312a and the second partition 4313a to be coupled thereto. Accordingly, a space between the first partition 4312a and the second partition 4313a may have a size corresponding to the size of the magnet 433a. The magnet 433a is mounted between the first partition 4312a and the second partition 4313a and the Hall sensor 434a is disposed under the magnet 433a.

The pressing portion 4314a protrudes from an inner surface of the moving frame 431a in the longitudinal direction thereof. The pressing portion 4314a is formed on one of the two side surfaces 4311a of the moving frame 431a. The pressing portion 4314a may protrude in a reversed one-side open rectangular shape or in a rectangular shape. The pressing portion 4314a is coupled to one end of a spring body 4320a of the spring 432a. The shape of the pressing portion 4314a may vary depending upon the shape of the spring 432a. Since the pressing portion 4314a is coupled to the spring 432a, movement of the moving frame 431a can be transmitted to the spring 432a.

The spring 432a includes a spring body 4320a; and a first connection plane 4321a, a second connecting plane 4322a and a third connecting plane 4323a formed on the spring body 4320a.

The spring body 4320a is a plate-shaped spring having a predetermined length and width. The spring body 4320a is disposed such that a plate surface of the spring body 4320a is disposed between the two side surfaces 4311a of the moving frame 431a to be parallel thereto. The spring body 4320a is formed at one end thereof with the first connection plane 4321a and at the other end thereof with the second connecting plane 4322a and the third connecting plane 4323a.

The first connection plane 4321a extends from one end of the spring body 4320a to be perpendicular to a plate surface thereof. The first connection plane 4321a is formed with a plurality of fastening holes and is coupled to the base frame 420a therethrough by fastening members 435a, such as bolts and the like. To this end, the base frame 420a may be formed with a plurality of fastening holes to which fastening members 436a are fastened.

The second connecting plane 4322a and the third connecting plane 4323a may extend from the other end of the spring body 4320a to be perpendicular to the plate surface thereof. The second connecting plane 4322a and the third connecting plane 4323a may extend in the same direction or in opposite directions. In FIG. 7, the second connecting plane 4322*a* and the third connecting plane 4323*a* extend in opposite directions. Each of the second connecting plane 4322*a* and the third connecting plane 4323*a* may be formed with a plurality of fastening holes. Although not shown in the drawings, the second connecting plane 4322*a* and the third connecting plane 4323*a* may be coupled to the pressing portion 4314*a* of the moving frame 431*a* by the fastening members.

That is, the spring 432*a* is secured at one end thereof to the base frame 420*a* and at the other end thereof to the moving frame 431*a*. As such, since the other end of the spring 432*a* not secured to the base frame 420*a* is pressed by the moving frame 431*a*, the spring body 4320*a* can be deformed in the direction P1 or P2.

On the other hand, the Hall sensor 434*a* is coupled to the sensor PCB 435*a* to be disposed under the magnet 433*a*. Although not shown in the drawings, the sensor PCB 435*a* may be secured to the base frame 420*a* by a fastening member.

As described above, in the force sensing module 430*a* according to the second embodiment, the first connection plane 4321*a* is perpendicularly formed on the spring 432*a* to be secured to the base frame 420*a*. Accordingly, the force sensing module 430*a* according to the second embodiment suffers from less vibration applied to the cart 10 in the vertical direction than the force sensing module according to the first embodiment.

Since the cart 10 moves on a floor in a room or on the ground, the cart 10 undergoes vibration not only in the horizontal direction but also in the vertical direction. Such vibration acts as noise disturbing accurate sensing. Noise becomes a factor causing complicated control. However, according to the present disclosure, the cart 10 has a structure allowing movement of the magnet 433*a* only in the horizontal direction, thereby enabling stable maintenance of a constant distance between the magnet 433*a* and the Hall sensor 434*a*. Accordingly, it is possible to achieve improvement in control efficiency and reduction in manufacturing costs through stable sensing and omission of a complicated control algorithm.

FIG. 9 is a perspective view of a force sensing module according to a third embodiment of the present disclosure. FIG. 10 is an exploded perspective view of the force sensing module shown in FIG. 9.

Referring to FIG. 9 and FIG. 10, a handle assembly 400*b* according to the third embodiment includes a handle bar 410*b*, a base frame 420*b* coupled to the interior of the handle bar 410*b*, and a force sensing module 430*b* disposed on the base frame 420*b*. The force sensing module 430*b* is coupled to the base frame 420*b*.

The force sensing module 430 includes a frame supporter moving in a direction of force input to the handle bar 410*b*, and a force sensor unit. The frame supporter is composed of a moving bracket 431*b*, a spring 432*b*, cover pads 436*b*, and a connecting plate 437*b*. The force sensor unit includes a magnet 433*b*, a Hall sensor 434*b*, and a sensor PCB 435*b*. The force sensing module 430*b* further includes a sensor holder bracket 438*b*.

The moving bracket 431*b* has a plate shape having a size corresponding to or less than a connecting plate 437*b* described below. The moving bracket 431*b* supports the magnet 433*b* described below and is coupled to the connecting plate 437*b*. When the cover pads 436*b* move, the moving bracket 431*b* moves the magnet 433*b* while moving together with the connecting plate 437*b*. Since the moving bracket 431*b* is coupled to the connecting plate 437*b* and the connecting plate 437*b* is supported at opposite ends thereof in the longitudinal direction by the cover pads 436*b*, force applied to the cover pads 436*b* can be evenly transmitted to the moving bracket 431*b*.

The moving bracket 431*b* is formed on an upper surface thereof with a plurality of coupling protrusions 4311*b* inserted into the fastening holes 4370*b* of the connecting plate 437*b*. The moving bracket 431*b* is formed on a lower surface thereof with a magnet receiving portion 4310*b* and a spring connecting portion 4312*b*.

The magnet receiving portion 4310*b* has a shape corresponding to the shape of the magnet 433*b*. According to the present disclosure, the magnet receiving portion 4310*b* may have a hexahedral shape that defines an accommodation space therein and is open at upper and lower sides thereof. Accordingly, the magnet receiving portion 4310*b* may have a box shape when viewed from the cover pads 436*b*. With the magnet 433*b* inserted into the magnet receiving portion 4310*b*, the Hall sensor 434*b* is disposed under the magnet 433*b*.

The spring connecting portion 4312*b* vertically extends downwards from a lower side of a plate surface of the moving bracket 431*b*. The spring connecting portion 4312*b* is a portion coupled to a second connection plane 43422*b* of the spring 432*b* described below. Thus, the spring connecting portion 4312*b* is formed at a location corresponding to the location of the second connection plane 4322. The spring connecting portion 4312*b* may be formed with a plurality of fastening holes and coupled to the second connection plane 4322 therethrough by fastening members.

The spring 432*b* includes a spring body 4320*b*; and a first connection plane 4321*b* and a second connection plane 4322 formed at opposite sides of the spring body 4320*b*. The spring 432*b* is provided at an upper side thereof with the moving bracket 431*b* and the connecting plate 437*b*, and at a lower side thereof with the connecting plate 437*b* and the base frame 420*b*. In addition, a pair of cover pads 436*b* is disposed at opposite sides of the spring 432*b*.

The spring body 4320*b* is a plate-shaped spring having a predetermined length and width. A plate surface of the spring body 4320*b* is disposed between the pair of cover pads 436*b* described below and is perpendicular to a plate surface of the base frame 420*b*. The spring body 4320*b* is formed at one end thereof with the first connection plane 4321*b* and at the other end thereof with the second connection plane 4322.

The first connection plane 4321*b* is bent at one end of the spring body 4320*b* and extends parallel to a plate surface of the spring body 4320*b*. The first connection plane 4321*b* has a smaller length than the spring body 4320*b*. The first connection plane 4321*b* is formed with a plurality of fastening holes and is coupled to the sensor holder bracket 438*b* therethrough by fastening members, such as bolts and the like.

The second connection plane 4322 extends from the other end of the spring body 4320*b*. Here, the second connection plane 4322 may be disposed to be coplanar with the plate surface of the spring body 4320*b* or may be formed in a bent shape. The second connection plane 4322 is formed with a plurality of fastening holes and is coupled to the moving bracket 431*b* therethrough by fastening members, such as bolts and the like. Alternatively, the spring body 4320*b* may be formed at the other end thereof with a through-hole so as to be coupled to the moving bracket 431*b* through the through-hole instead of forming a separate second connection plane.

The sensor holder bracket 438*b* is coupled to the spring 432*b* and the sensor PCB 435*b* to support the spring 432*b* and the sensor PCB 435b. The sensor holder bracket 438b has a plate shape having a shorter length than the base frame 420b. The sensor holder bracket 438b is coupled to an upper surface of the base frame 420b. The sensor PCB 435b having the Hall sensor 434b coupled thereto is mounted on one end of an upper surface of the sensor holder bracket 438b. The sensor holder bracket 438b may also be partially bent at opposite edges thereof to form guide ribs 4381b. The sensor holder bracket 438b may be provided at the other end thereof with a plate-shaped spring coupling portion 4380b extending upwards from the guide rib 4381b.

The spring coupling portion 4380b may be disposed parallel to the first connection plane 4321b. The spring coupling portion 4380b may be formed with a plurality of fastening holes and coupled therethrough to the first connection plane 4321b by fastening members. Since the spring coupling portion 4380b is parallel to the first connection plane 4321b, the spring coupling portion 4380b is also parallel to the spring body 4320b. Further, since the spring coupling portion 4380b is coupled to the first connection plane 4321b to secure the spring body 4320b, a bent direction of the spring 432b is a direction (direction P1 or P2) of approaching or moving away from the spring coupling portion 4380b.

The guide ribs 4381b may serve to restrict movement due to excessive deformation of the spring 432b. When the spring 432b is excessively deformed, the moving bracket 431b coupled to the spring 432b has a large displacement and the magnet 433b can deviate from a sensing region of the Hall sensor 434b. Accordingly, the base frame 420b and the guide ribs 4381b are designed in consideration of the sensing region of the Hall sensor 434b so as to allow the magnet 433b within the sensing region of the Hall sensor 434b.

The cover pads 436b have a substantially rectangular plate shape and are provided as a pair of cover pads having the same structure and disposed to face each other. Each of the cover pads 436b has an outer surface exposed outside the handle bar 410b and an inner surface facing the interior of the handle bar 410b. The outer surface of the cover pad 436b may be disposed coplanar with one surface of the handle bar 410b to which the cover pad 436b is exposed. The outer surface of the cover pad may be formed to have a radius of curvature when the handle bar 410b is formed to have a curved surface. For convenience of description, in the pair of cover pads 436b, a cover pad disposed to face the receiving portion 200 is defined as an inner cover pad 436b and a cover pad disposed opposite the inner cover pad is defined as an outer cover pad 436b.

The cover pads 436b are pushed into the handle bar 410b when pressed by a user. Since the pair of cover pads 436b is disposed to face each other, it is possible to sense force in both directions P1, P2 through the cover pads 436b. Each of the cover pads 436b is formed on an inner surface thereof with a guide portion 4360b for coupling of the connecting plate 437b.

The guide portion 4360b protrudes from an upper side of the inner surface of the cover pad 436b in the longitudinal direction thereof. The guide portion 4360b has a plate shape having a predetermined width. The guide portion 4360b is formed with a plurality of fastening holes and is coupled to the connecting plate 437b therethrough by fastening members, such as bolts and the like. Since the pair of cover pads 436b is disposed to face each other, the guide portion 4360b supports the connecting plate 437b at opposite sides of the connecting plate 437b in the longitudinal direction thereof.

The connecting plate 437b is disposed to face the base frame 420b and is coupled to an upper surface 4310a of the guide portion 4360b. The connecting plate 437b serves to connect the pair of cover pads 436b. To this end, the connecting plate 437b is also formed with a plurality of fastening holes and coupled to the guide portion 4360b therethrough by fastening members. The moving bracket 431b is mounted on a lower surface of the connecting plate 437b.

The connecting plate 437b is formed with a plurality of coupling holes 4370b at a portion thereof to be coupled to the moving bracket 431b. The connecting plate 437b may be coupled to the moving bracket 431b by inserting coupling protrusions 4311b of the moving bracket 431b into the coupling holes 4370b. The connecting plate 437b may be formed with a through-hole and coupled to the moving bracket 431b by a fastening member.

As described above, the force sensing module 430b according to the third embodiment has a structure wherein one end of the spring 432b is secured to the base frame 420b through the sensor holder bracket 438b. In addition, the spring 432b is deformed in association with the cover pads 436b moving only in the direction P1 or P2. Accordingly, the cart according to the third embodiment suffers less vibration in the vertical direction than the cart 10 according to the first embodiment.

Accordingly, it is possible to achieve improvement in control efficiency and reduction in manufacturing costs through stable sensing and omission of a complicated control algorithm.

In addition, the force sensing module 430b described above is operated in association with the cover pads 436b, the connecting plate 437b, the moving bracket 431b, and the spring 432b coupled to each other, and the spring 432b is configured to have the degree of moving freedom only in the directions of force applied to the cart (directions P1 and P2). Accordingly, a preset distance can be maintained between the Hall sensor 434b and the magnet 433b, thereby enabling accurate sensing.

In the above embodiments, when force is applied in the direction P1 or P2, since the Hall sensor 434, 434a or 434b senses application of the force and the controller 130 provides the power assist function, the handle assembly can be referred to as being operated in "a power assist mode". When force is not applied in the direction P1 or P2, the controller 130 may determine that a user moves the cart 10 in a manual mode.

Although not shown in the drawings, the handle bar 4100 may include a switch adapted to send power assist mode on/off signals to the controller 130 instead of the Hall sensors 434, 434a, 434b and the magnets 433, 433a, 433b. In this structure, a user may manipulate the switch to move the cart in the power assist mode.

Although some embodiments have been described herein with reference to the accompanying drawings, it should be understood that these embodiments are provided for illustration only and are not to be construed in any way as limiting the present disclosure, and that various modifications, changes, alterations, and equivalent embodiments can be made by those skilled in the art without departing from the spirit and scope of the present disclosure. In addition, although advantageous effects of a certain component are not explicitly described in description of the embodiments of the present disclosure, it should be understood that expectable effects by the component are also recognized.

INDUSTRIAL APPLICABILITY

A cart according to the present disclosure may be applied in various ways to a commercial field, a leisure field, a distribution field, and the like.

The invention claimed is:

1. A handle assembly for a cart, the handle assembly comprising:
    a handle bar locatable at one side of the cart to receive an external force applied in a movement direction of the cart; and
    a force sensing assembly including:
        a moving frame disposed inside the handle bar in a longitudinal direction of the handle bar, the moving frame having two surfaces facing each other;
        a spring having a first end coupled at an interior of the handle bar and a second end extending adjacent to the moving frame, the spring configured to be pressed and deformed by the moving frame in the direction of the external force applied to the handle bar;
        a magnet coupled to the second end of the spring or a lower side of the moving frame;
        a Hall sensor located adjacent to the magnet to detect a position of the magnet; and
        a sensor printed circuit board (PCB) for determining the direction of the external force based on the detected position of the magnet from the Hall sensor,
    wherein the Hall sensor is mounted to the sensor PCB, and
    wherein the spring includes a spring body which is plate-shaped and extends parallel to the side surfaces of the moving frame.

2. The handle assembly according to claim 1, further comprising a base frame extending in the longitudinal direction of the handle bar and coupled to the interior of the handle bar, the base frame including an upper surface having a first side and a second side,
    wherein the first end of the spring is coupled to the first side of the upper surface of the base frame, and the sensor PCB is coupled to the second side of the upper surface of the base frame.

3. The handle assembly according to claim 2, wherein the moving frame includes:
    a top surface disposed in the longitudinal direction of the handle bar;
    side surfaces connected to opposite sides of the top surface, the side surfaces facing each other; and
    a plurality of partitions disposed between the top surface and the side surfaces, and
    wherein the magnet is provided in a space between the plurality of partitions.

4. The handle assembly according to claim 3, wherein the spring further includes:
    a first connection portion vertically extending from a first end of the spring body and coupled to the upper surface of the base frame; and
    a second connection portion vertically extending from a second end of the spring body and coupled to the moving frame.

5. A handle assembly for a cart, the handle assembly comprising:
    a handle bar locatable at one side of the cart to receive an external force applied in a movement direction of the cart; and
    a force sensing assembly including:
        a frame support provided on the handle bar and movable in the direction of the external force applied to the handle bar; and
        a force sensor located adjacent to the frame support to sense a movement direction of the frame support,
    wherein the frame support comprises:
        a pair of cover pads disposed on the handle bar; and
        a spring configured to be pressed and deformed by the external force applied to the handle bar,
    wherein the spring includes a spring body which is plate-shaped and extends parallel to the cover pads.

6. The handle assembly according to claim 5, wherein the force sensing assembly further includes:
    a magnet coupled to a first side of the frame support and movable in the direction of the frame support;
    a Hall sensor located adjacent to the magnet to detect a position of the magnet; and
    a sensor printed circuit board (PCB) for determining the direction of the external force based on the detected position of the magnet from the Hall sensor.

7. The handle assembly according to claim 6, wherein the frame support further comprises:
    a connecting plate disposed between the cover pads and connecting the cover pads to each other; and
    a moving bracket coupled to a lower portion of the connecting plate and receiving the magnet,
    wherein the spring has a first end coupled to a lower portion of the moving bracket and a second end coupled to an interior of the handle bar.

8. The handle assembly according to claim 7, further comprising a sensor holder bracket disposed on the handle bar, the sensor holder bracket including a spring coupling portion at a first end of the sensor holder bracket,
    wherein the spring is coupled to the spring coupling portion of the sensor holder bracket, and
    wherein the sensor PCB is coupled to a second side of the sensor holder bracket.

9. The handle assembly according to claim 8, further comprising a base frame provided on the handle bar and coupled to a lower surface of the sensor holder bracket.

10. The handle assembly according to claim 9, wherein the base frame has an edge extending upward along a longitudinal direction of the handle bar to guide the force sensing assembly, and
    wherein the base frame has a length greater than a length of the spring.

11. The handle assembly according to claim 10, wherein a first end of the spring is coupled to the base frame and a second end of the spring is coupled to the moving frame,
    wherein during operation of the moving frame, the second end of the spring is pressed to allow the spring to be deformed, and
    wherein the spring is deformable in front and rear directions of the cart.

12. The handle assembly according to claim 8, wherein a size of the moving bracket is equal to or smaller than a size of the connecting plate, and
    wherein the moving bracket is coupled to the connecting plate while supporting the magnet to move the magnet according to movement of the connecting plate.

13. A cart comprising:
    a main body including:
        a driver to generate electric power; and
        a controller configured to control the driver;
    a wheel coupled to a lower portion of the main body to move the main body;

a handle bar provided at one side of the main body to receive an external force applied in a movement direction of the main body; and a force sensing assembly including:
- a frame support disposed on the handle bar and movable in the direction of the external force applied to the handle bar;
- a force sensor disposed adjacent to the frame support to sense the movement direction of the frame support;

a moving frame; and a spring, wherein the controller is configured to transmit the electric power generated from the driver to the wheel according to the movement direction of the frame support sensed by the force sensor, and wherein the spring includes a spring body which is plate-shaped and extends parallel to the side surfaces of the moving frame.

14. The cart according to claim 13, further comprising:
a base frame extending in a longitudinal direction of the handle bar and coupled to an interior of the handle bar,
wherein the force sensor includes a sensor printed circuit board (PCB),
wherein the base frame includes an upper surface having a first side and a second side,
wherein the spring has a first end coupled the first side of the upper surface of the base frame, and
wherein the sensor PCB is coupled to the second side of the upper surface of the base frame.

15. The cart according to claim 14, wherein the spring further includes a second end, the first end of the spring being opposite to the second end of the spring,
wherein the spring is configured to be pressed and deformed by the frame support in the direction of the external force applied to the cart,
wherein the force sensor includes:
- a magnet coupled to the second end of the spring; and
- a Hall sensor disposed adjacent to the magnet for detecting a position of the magnet,
wherein the Hall sensor is mounted to the sensor PCB, and wherein the sensor PCB is configured to determine the direction of the external force based on the detected position of the magnet from the Hall sensor.

16. The cart according to claim 15,
wherein the moving frame includes:
- a top surface disposed in the longitudinal direction of the handle bar;
- side surfaces connected to opposite sides of the top surface and facing each other; and
- a plurality of partitions disposed between the top surface and the side surfaces, and wherein the magnet is positioned in a space between the partitions.

17. The cart according to claim 16, wherein the spring further includes:
- a first connection portion vertically extending from a first end of the spring body and coupled to the upper surface of the base frame; and
- a second connection portion vertically extending from a second end of the spring body and coupled to the moving frame.

18. The cart according to claim 13, wherein the controller is further configured to control the driver to supply an assistant force to the wheel to provide a power assist function.

19. The cart according to claim 18, wherein the controller is further configured to:
- determine a direction of the external force applied to the cart by a user through the force sensing assembly; and
- control a direction of supplying an assistant force generated from the driver and a rotational direction of the wheel to move the cart in the determined direction of the external force.

20. The cart according to claim 18, wherein the driver is connected to the wheel, and
wherein the controller is further configured to control a rotational direction of the wheel through communication with the force sensing assembly and the driver or control a power transmission direction of the driver connected to the wheel.

* * * * *